July 7, 1953 J. LEVINE 2,644,730
ROLLER SUPPORTING CAGE FOR ROLLER BEARINGS
Filed March 5, 1952
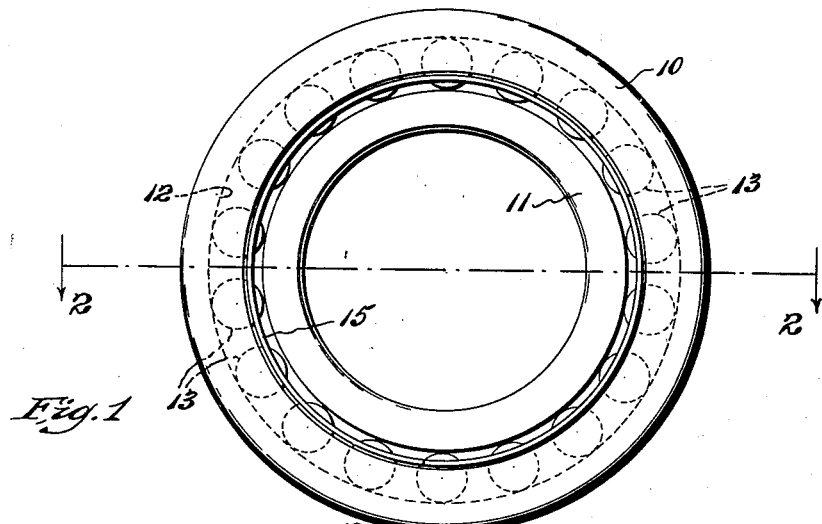
Fig. 1
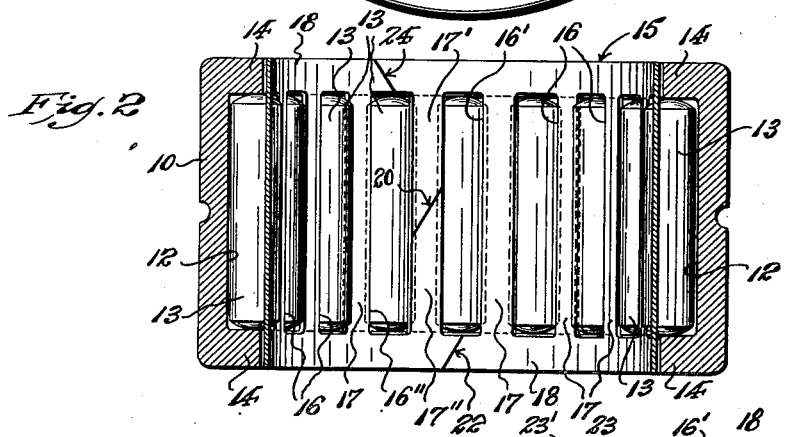
Fig. 2
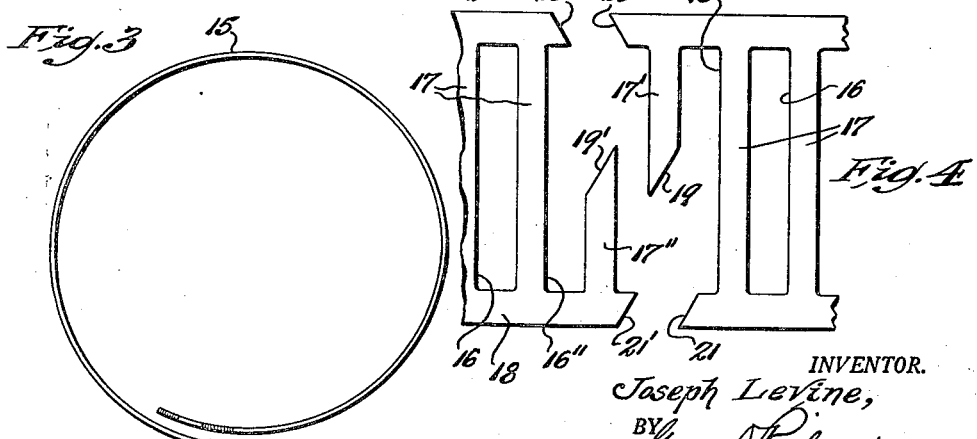
Fig. 3
Fig. 4
INVENTOR.
Joseph Levine,
BY George Richards
Attorney Patented July 7, 1953

2,644,730

UNITED STATES PATENT OFFICE 2,644,730

ROLLER SUPPORTING CAGE FOR ROLLER BEARINGS

Joseph Levine, Irvington, N. J.

Application March 5, 1952, Serial No. 274,919

2 Claims. (Cl. 308—213)

This invention relates to roller bearings comprising a bearing body having in a circumferential face thereof a countersunk raceway bounded by side wall flanges, in which raceway a series of anti-friction rollers are housed, and including a slotted cylindrical sheet metal cage for retaining said rollers in operative circumferentially spaced relation around the bearing body.

Roller bearings as heretofore known to the art have included discontinuous sheet metal cages wrought into split cylindrical forms, with their transverse juxtaposed or meeting ends disposed, in some cases, parallel to the axis of the cage, or, in other cases, oblique to the axis of the cage. Such split cages can be temporarily diametrically and circumferentially contracted or expanded, as may be required, to facilitate endwise application thereof to and assembly with a bearing body and into operative engagement with anti-friction rollers to be retained thereby in the raceway of the bearing body. Such contraction or expansion is attained by radially separating the abutted meeting ends of the cage, and then manipulating the cage so as to temporarily reduce or expand its diameter and circumference. After the so contracted or expanded cage is assembled with the bearing body and operatively engaged with the rollers to be retained thereby, the cage ends are again brought mutually into aligned abutment, thus returning the cage to its normal diameter and circumference. If the cage is split on a transverse line parallel to the axis of the cage, there is no interlocking of the abutted meeting ends of the cage, and risk of relative displacement of said ends under centrifugal or other force occurs, with consequent risk of displacing the anti-friction rollers or impeding their free action. If the cage is split on a transverse line oblique to the axis of the cage, so that the break or split crosses a plurality of the roller embracing slots of said cage, there is likewise no interlocking of the abutted meeting ends of the cage, except that the rollers which extend across the oblique break or split act as keys to resist to some extent separation of the abutted meeting ends of the cage. It has been found, however, that use of the rollers for such keying effect is undesirable, since any tendency to separating movement of the meeting ends of the cage is transmitted to opposite end portions of the keying rollers embraced by a divided cage slot, in respectively opposite directions, thereby tending to shift these rollers askew, that is out of normal parallel relation to the axis of the bearing. Such displacement of the rollers subjects the same to undesirable friction and wear, so that smooth performance of the bearing is impeded.

Having the above stated faults of split roller supporting cages of the prior art in view, it is an object of this invention to provide an improved construction of split cylindrical sheet metal bearing roller cage, the meeting ends of which can be radially separated to permit contraction or expansion thereof as may, in any given case, be required, but wherein said meeting ends are so formed that, when abutted, the same will mutually interlock so as to be self-retained against separation under centrifugal or other force, thereby assuring maintenance of the normal cylindrical symmetry of the cage, and proper retaining support of bearing rollers thereby, without risk of transmission to the latter of disaligning or frictional stress.

The above and other objects of this invention will be understood from a reading of the following detailed description thereof in connection with the accompanying drawings, in which:

Fig. 1 is an end elevational view of a roller bearing equipped with a roller retaining cage according to this invention; and Fig. 2 is a transverse sectional view of the same, taken on line 2—2 in Fig. 1, with the inner race ring removed.

Fig. 3 is an end elevational view of the roller cage per se, showing its meeting ends separated to permit temporarily contraction or expansion of the cage.

Fig. 4 is a fragmentary plan view of the meeting end portions of the cage, shown in separated relation.

Referring to the drawings, an illustrative embodiment of the invention, as shown in Figs. 1 and 2, comprises a roller bearing having an outer race ring 10 and an inner race ring 11. The outer race ring is provided with an internal raceway 12 to house a plurality of anti-friction rollers 13. Said raceway is in the form of an annular channel having side walls 14, spaced apart at a distance corresponding to the lengths of the rollers, whereby the ends of said rollers impinge upon said side walls, so as to be held thereby against axial displacement. The depth of the raceway channel is somewhat in excess of the radial dimensions of the rollers.

Inserted within the outer race ring 10 is a split cylindrical sheet metal roller retaining cage 15 made according to this invention; said cage being adapted to lie between the outer race ring 10 and the inner race ring 11 of the bearing. The cylindrical cage 15 is provided with a series of circumferentially spaced slots 16 of widths less than the diametric size of the rollers 13, whereby side margins of respective slots engage the peripheries of respective rollers outwardly of the axes of the latter, thereby retaining the rollers in desired circumferentially spaced relation around the bearing, with their outer peripheral faces exposed for engagement by the inner race ring 11.

The roller retaining cage 15 is ordinarily stamped out of flat sheet metal having requisite resiliency to provide a strip of required width and length from which a cage of required length and diameter can be formed, and so as to provide said strip with a plurality of longitudinally spaced apart slots 16 corresponding in number to the number of anti-friction rollers to be accommodated; said slots being separated by intervening transverse web members 17, which extend between opposite longitudinal marginal portions 18 of the cage forming strip.

The respective ends of the cage forming strip are formed to provide, when brought into normal abutted meeting relation, a joint formation of such character as will be adapted to mutually interlock together the abutted ends of the strip against circumferential separation, while nevertheless permitting said ends to be radially displaced to open the joint whereby to condition the cage formed therefrom for manipulation to temporarily contract or expand the same as may be required. To this end, a terminal web member, that is a web member located in the area of the split or break of the ultimately formed cylindrical cage, is divided to provide a half-section 17' extending from one marginal portion 18 of the cage strip, and another half-section 17" extending from the other or opposite marginal portion 18 of said cage strip. The meeting ends of the thus divided terminal web are cut to form corresponding oblique end edges 19 and 19' (see Fig. 4) which, when abutted, provide an oblique middle joint 20 extending between the terminal slots 16' and 16" (see Fig. 2). The meeting ends of one longitudinal marginal portion 18 of the cage strip are cut to form corresponding oblique end edges 21 and 21' (see Fig. 4) which, when abutted, provide an oblique joint 22 extending outwardly from an end of one terminal slot 16' to the outer edge of this marginal portion 18 in one inclined direction (see Fig. 2); and the meeting ends of the other or opposite longitudinal marginal portion 18 are cut to form corresponding oblique end edges 23 and 23' (see Fig. 4) which, when abutted, provide an oblique joint 24 extending outwardly from the end of the other terminal slot 16" to the outer edge of the latter marginal portion 18 in an oppositely inclined direction (see Fig. 2).

To apply the split cage to the outer race ring 10, the meeting ends of said cage are relatively displaced radially to separate the same and break the joint formation thereof (see Fig. 3). The cage can thereupon be contracted for insertion endwise into the interior of the outer race ring, and, when in place therein, can then be expanded to engage the respective anti-friction rollers 13 in the embrace of corresponding cage slots, for projection through the latter. The antifriction rollers being thus engaged, the meeting ends of the cage are brought into abutting relation, thus closing the joints 20, 22 and 24, so that the cage will be locked thereby in its normal operative cylindrical condition. Owing to the obliquity of the middle joint 20, circumferential separation of the meeting ends of the cage is inhibited, while, at the same time, owing to the relative opposite or reverse obliquity of the outer joints 22 and 24, lateral displacement or separation of the meeting ends of the cage is likewise inhibited. It will thus be obvious the cage joint is of such character that, when the meeting ends are joined thereby, the normal operative cylindrical condition of the cage is self-maintained, without necessity for use of anti-friction rollers as keys for retaining the cage closed.

Since the terminal slots 16' and 16" are not crossed by the middle joint 20, so as to be wholly transversely divided between their ends, anti-friction rollers embraced by said slots are not subjected to pulling stresses applied to opposite end portions thereof respectively in opposite directions and tending to shift said rollers askew.

Although there is shown, by way of illustration, a roller bearing race ring provided with internal cage retained anti-friction rollers, no limitation is intended to this specific type of roller bearing, since it will be obvious that the invention is equally applicable to a roller bearing race ring provided with external cage retained anti-friction rollers.

Having now described my invention, I claim:

1. In a roller bearing having an annular channel forming a raceway and anti-friction rollers housed in and across said raceway, a discontinuous cylindrical roller retaining cage having slots to embrace said rollers including terminal slots respectively adjacent the respective meeting ends of said cage, said slots being separated by transverse web members extending between longitudinal marginal portions of the cage, said meeting ends of the cage being correspondingly cut to provide, when abutted, an oblique middle joint extending across the web member between said terminal slots, and outer oppositely inclined oblique joints respectively extending across the respective longitudinal marginal portions of the cage, one from an end of one terminal slot and the other from the opposite end of the other terminal slot.

2. A roller cage comprising a body of resilient sheet metal having longitudinally spaced roller embracing slots including terminal slots respectively adjacent the respective ends of said body, said slots being separated by transverse web members extending between longitudinal marginal portions of the body, said body being wrought into cylindrical form with its ends in meeting relation, said meeting ends being correspondingly cut to provide, when abutted, an oblique middle joint extending across the web member between said terminal slots, and outer oppositely inclined oblique joints respectively extending across the respective longitudinal marginal portions of the body, one from an end of one terminal slot and the other from the opposite end of the other terminal slot.

JOSEPH LEVINE.

References Cited in the file of this patent

UNITED STATES PATENTS

| Number | Name | Date |
|---|---|---|
| 861,870 | Lockwood | July 30, 1907 |
| 2,503,070 | Reiss | Apr. 4, 1950 |

FOREIGN PATENTS

| Number | Country | Date |
|---|---|---|
| 19,315 | Great Britain | A. D. 1898 |